United States Patent

Bartholomew

[11] Patent Number: 5,000,491
[45] Date of Patent: Mar. 19, 1991

[54] MEANS FOR HOSE CLAMP REPLACEMENT

[75] Inventor: Donald D. Bartholomew, Marine, Mich.

[73] Assignee: Proprietary Technology, Inc., Southfield, Mich.

[21] Appl. No.: 388,507

[22] Filed: Aug. 2, 1989

[51] Int. Cl.⁵ .......................................... F16L 39/00
[52] U.S. Cl. ...................................... 285/319; 285/318; 285/110
[58] Field of Search ..................... 285/110, 319, 318

[56] References Cited

U.S. PATENT DOCUMENTS

| | | | |
|---|---|---|---|
| 2,066,008 | 12/1936 | Knoerzer | 285/110 X |
| 2,094,889 | 10/1937 | Hooper | 285/110 X |
| 2,546,096 | 3/1951 | Hauf | 285/110 X |
| 3,400,954 | 9/1968 | Brown | 285/110 |
| 3,698,727 | 10/1972 | Greenwald | 285/110 X |
| 4,318,547 | 3/1982 | Ericson | 285/110 X |
| 4,681,351 | 7/1987 | Bartholomew | 285/319 |
| 4,743,051 | 5/1988 | Proni | 285/319 |
| 4,749,214 | 6/1988 | Hoskins et al. | 285/110 X |

FOREIGN PATENT DOCUMENTS 940833  11/1963  United Kingdom ................ 285/110

Primary Examiner—Randolph A. Reese
Assistant Examiner—Carol I. Bordas
Attorney, Agent, or Firm—Harness, Dickey & Pierce

[57] ABSTRACT

A union enabling a rigid pipe to replace a flexible hose in applications where there is no relative movement of the points connected by the pipe and union. The new union accommodates the movements required for installation and removal, and accommodates the tolerances that are encountered during all manufacturing and assembly steps.

8 Claims, 1 Drawing Sheet

MEANS FOR HOSE CLAMP REPLACEMENT

BACKGROUND AND SUMMARY OF THE INVENTION

The current means by which two pipes are connected with a piping system which confines liquid or gaseous pressure is to use a flexible hose or a combination of flexible hose or hoses and a rigid pipe section. In cases where both ends of the piping system are fixed relative to each other, it is still common practice to use one or more flexible sections when the piping that is used cannot be easily bent or flexed. This is because of the difficulty of making any pipe that exactly fits between the two points, and the difficulty of achieving a reliable seal which will accommodate the inevitable mismatch of the pipe ends and the connection points.

To attach the hoses or flexible segments, it is necessary to clamp the hose or flexible segment to the rigid segment. A further matter is the cost of the clamping means and the reliability of the clamping means, which is typically an operator dependent assembly. Also, the cost of the flexible portion is many times the cost of a rigid substitution.

It is an object of the present invention to provide a connecting means which will seal the pressure confined by the system.

Another object of the invention is to provide a connecting means which will accommodate the normal variations of a rigid pipe.

Another object is to provide a connecting means which will allow the movements that are necessary for installation and removal of the rigid pipe member.

Another object is to provide a means of connecting that is less sensitive to operator or assembler error.

Another object is to provide a means of connecting which may be incorporated in the end of a rigid pipe, or as a port in a device, or as a union device for connection of two pipe ends.

Another object is to provide a means where system cost may be reduced by substituting a pierce of rigid pipe for a more expensive flexible member.

Another object is to provide a means whereby a superior rubber, that is more expensive, may be used for sealing because of the small amount that is used relative to the cost of the flexible member.

Another object is to provide increased service life when compared to the service life of the flexible member.

DETAILED DESCRIPTION OF THE PREFERRED EMBODIMENT

Figure 1:
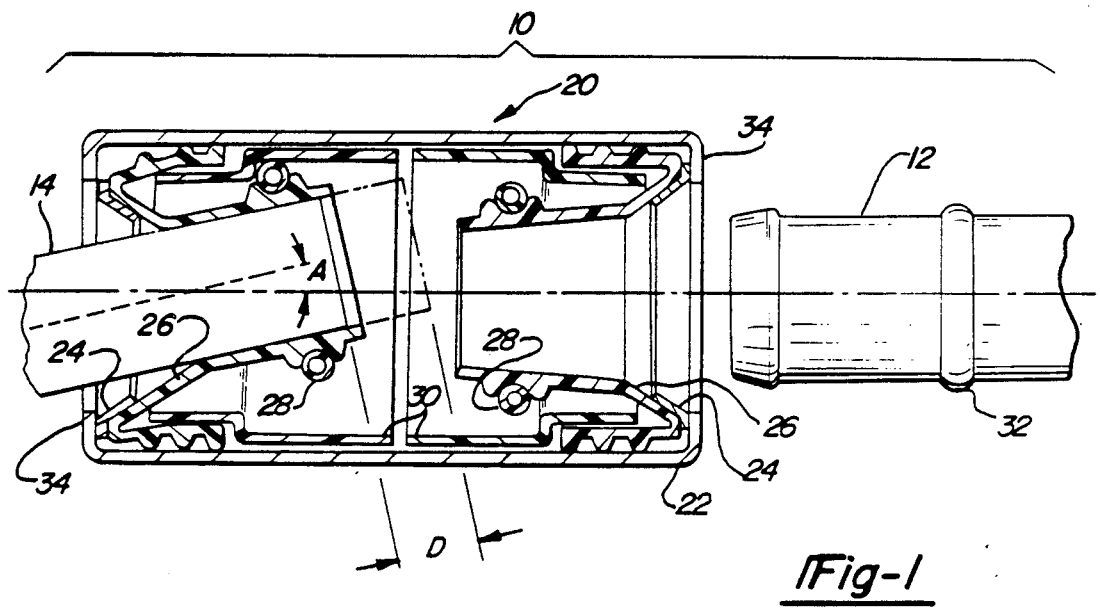
FIG. 1 is a cross-section view of two pipe ends joined together in accordance with the present invention.

Referring to FIG. 1, a union employing the means disclosed, and two male pipe ends are shown as 10. The union 20 is for sealably connecting pipe portion 12 to pipe portion 14.

The union 20 consists of a housing 22 which contains accommodating retainer-guide 24, sealing means 26, seal compression assisting means 28, which is shown as a garter spring, and means 30 which acts to maintain the position of seal 26 in the interior of housing 22 when pipes 12 and 14 are inserted into union 20.

The various elements 22, 24, 26, 28 and 30 are designed so as to provide accommodation of off-axis angle "A" and enable in-and-out movement "D" as shown for pipe portion 14.

Specifically accommodating retainer-guide 24 has an outside flange diameter that is smaller than the inside diameter of housing 22. This allows guide 24 to be moved off-centerline axis of union 20 to accommodate the situation shown with pipe portion 14. Guide 24 also has an inward taper lead portion that assists the mounting of union 20 to a pipe end, and acts as a rigid backing for a flexing portion of seal 26. Guide 24 thus serves a multifunction purpose.

Seal 26 is a special shape of what is broadly categorized as "U"-cup type seals. In the case of seal 26, the elongated inner portion allows better accommodation of off-axis angles "A", and the design also more easily accommodates the flexing that is required as a non-on-axis condition like that shown where pipe portion 14 enters union 20 and accommodating retainer-guide 24 is forced to displace off-axis to accommodate incoming pipe portion 14. The normal practice of disposing annular rings about sealing surfaces to concentrate the hydrostatic forces that act on the inner (wet) surfaces of the seal arms ("U"-arms) may be employed where helpful. Force concentrating rings have been shown in FIG. 1 on the outside diameter of seal 26.

Seal compression means 28 is used for two main functions. The first function is to add hoop strength to seal 26 so that the accommodations, and resulting distortion of seal 26 due to off-axis pipe conditions are more reliably met for a longer service life. The second main function is to provide a more positive non-blow-off grip of union 20 to any bead or barb on a pipe end, such as is shown on the end of pipe portion 12. Forces that would make union 20 go further on the male end being connected are resisted by the standard hose stop bead 32.

Spacer 30 serves the purpose of maintaining the position of seal 26. In the case of a union, two of these spacers may be used to assure that the two seals remain in position. There are a number of different means by which spacer elements 30 may accomplish this function, it is only necessary that the spacer element movement inward be prevented in some manner. The important feature of the spacer that would be used in the means herein disclosed is that the spacer be of such design as to apply positioning force to sealing means 26 near the open end of the female that accepts the male pipe end being connected, this assures that the distortion in seal 26 that is required in off-axis situations takes place in the desired manner.

As an example of how the union 20 might be used, consider a water cooling pipe on an engine that presently consists of a screw-in nipple adaptor, a length of hose with two clamps, a run of rigid pipe, with a length of hose (and two clamps) to connect to a cast fixed hose nipple on a device that is bolted to the engine. There are tolerances (probably as much as $+\frac{1}{4}$ inch in all directions when one considers the tolerances in casting, bolting and threading in of the nipple adapter. Add to those tolerances the normal variations in pipe bending angles and lengths, and it is immediately clear why the flexible hose sections are required.

In this case the first nipple fitting and hose with its two clamps are replaced by a thread in quick connector of the type that uses an outward bead near the pipe end to lock the pipe in place. Later for further cost savings, the port that the nipple threads into can become the female housing for the quick connector, so that it is only necessary to snap the quick connector internal parts into the port. For maximum accommodation of off-axis pipe to port mismatch, the quick connector could also use the internal components of one end of union 20. At the other end of this example, union 20 would be installed over the cast on male hose nipple. The pipe communicating the quick connector and union 20 would still be smooth on the exterior for sealing, but would not have the customary two beads at the union end, and only one bead at the quick connector end.

The pipe would first be inserted in the union, and pushed into the union a distance sufficient to clear entry of the other pipe end into the quick connector. The entire pipe would be moved toward the quick connector as the quick connector end is installed and snapped into place.

Note the labor costs:

(a) If a screw in quick connector is used the cost is the same as screwing in the hose nipple. If the screw port were converted to a quick connect female port, this cost would be about the same as installing the quick connector internal parts.

(b) At the opposite end, pushing the union onto the nipple would be about the same as pushing a length of hose onto the nipple.

(c) The pipe is merely pushed into the union, then by reversing the motion snapped into the quick connector. This is much less involved than pushing the pipe into a hose at one end and trying to get the pipe into a hose at the other end.

(d) With the new method, assembly is complete. With the old method four hose clamps must be positioned and torqued to the proper setting. Add to this that often you can hardly get to one or more of the clamps and you begin to appreciate the savings in cost and the improved reliability.

Now note the material costs:

(a) The thread-in quick connector will cost about as much as the thread-in hose nipple, plus two hose clamps. Later the cost may be further reduced by making the screw-in port a quick connector female port.

Savings-most of the cost of the hose, extending the length of the rigid pipe is trivial when compared to the hose cost.

(b) At the other end the union probably will cost about the same as a short piece of hose plus the two hose clamps, again extending the rigid pipe is trivial against hose cost.

(c) Three beads on the pipe are saved.

Results:

Some savings in material, a large savings in labor costs and a definite improvement of first time reliability and a longer safer service life.

The accommodating means of replacing hose and hose clamps may also, as previously mentioned be used in a number of ways. Use as a pipe port and as a quick connector sealing means have been previously mentioned.

Referring again to FIG. 1, the means when used as a pipe end as a quick connector may easily be seen if one considers just the right half of the union 20 and nipple 12.

Figure 2:
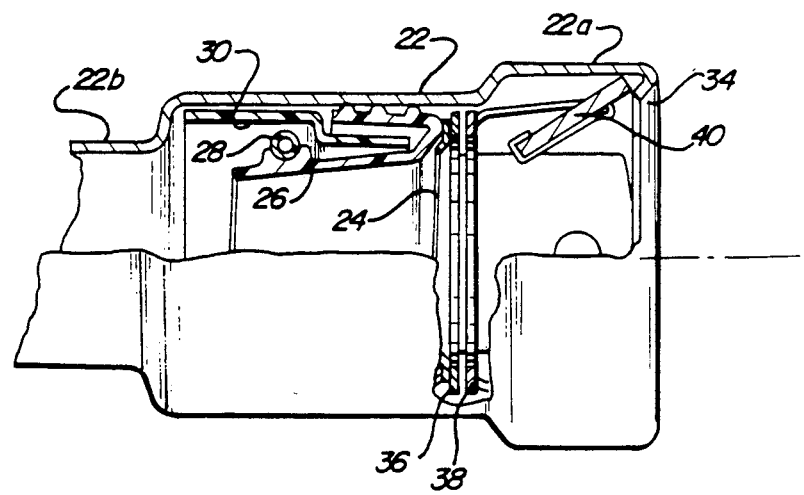
FIG. 2 is a side elevation view partially in cross-section of a sealing device in accordance with the present invention.

Housing 22 end closure 34, which retains all of the internal parts, may be formed inward after the internal port end parts are inserted, or the female housing port may be formed to accept another closing means, such as a snap ring, that provides a surface for guide 24 to act against. In the case of a quick connector, means of retaining nipple 12 in the interior of the port are required. This would employ an external bead 32 on pipe 12 for a retainer to act against so that pull out forces are transferred to some housing abutting surface that may be similar to 34 of housing 22. End 34 of FIG. 1 is functionally replaced by some other means, such as a snap in device. FIG. 2 shows one such embodiment.

Referring to FIG. 2, the accommodating seal and other internal parts are shown in a housing 22 and 22A which has been adapted to receive element 36 (FIG. 2A) which acts to hold accommodating guide-retainer (for the seal 26) 24 and a snap lock retainer (38 and 40) for a beaded pipe end as shown in FIG. 1 as 12 with bead 32. This retaining means 38-40 is of the general concept where the flexing means 38 is separated from the compression means 40. In this case, the compressive members 40 are actually separate parts mounted on flexing means 38, and are of much heavier material in order to provide high pull-out strength once tube 12 is installed.

The concept disclosed herein modifies the sealing means to provide a wide range of accommodation for misalignment of pipes. FIG. 2 is thus a combination of the accommodating seal and other internal parts described in FIG. 1 and a means for holding the accommodating seal and other internal parts described in FIG. 1 (element 36 shown in FIG. 2A) and a retaining means shown in FIG. 2B.

The means which is one end of union 20 in FIG. 1 may thus be used with a separate retaining means for pipe 12 of FIG. 1, as shown in FIG. 2.

It is also noted that the union 20 of FIG. 1 does not have to be the same size (diameter) at both ends, nor does the pipe leading from housing 22 in FIG. 2 have to be the same size as the pipe end that plugs into the connection of FIG. 2. This is shown as 22B in FIG. 2.

Figure 2A:
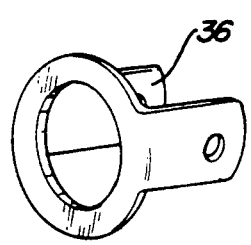
FIG. 2A and B is an exploded perspective view of the retainer of FIG. 2.
Figure 2B:
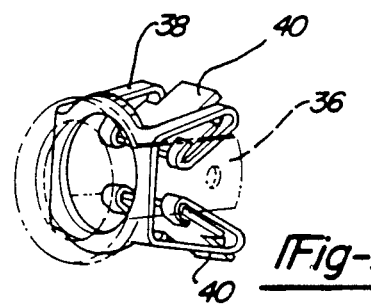

The holes shown in the arms of element 36 in FIG. 2A are for the purpose of removing element 36 from housing portion 22A in cases where it is necessary to replace an internal component. It is also noted that there may arise situations where housing portion 22A may be a separate piece that slips over housing portion 22, or one may want to combine a checking valve in portion 22B.

While the above describes the preferred embodiment of the present invention, it should be understood that the present invention is susceptible to modification, variation, and alteration without varying from the scope and fair meaning of the subjoined claims.

I claim:

1. A sealing device for use in a pressure confining piping system, adaptive for off-axis mating of two pipe ends, and adaptive to different separations of pipe ends, the sealing device comprising:

a housing having an inner surface defining a bore adapted to receive the pipe ends, said inner surface having a desired configuration and diameter;

an adaptive ring freely disposed within said housing, said adaptive ring having an outer diameter less than the diameter of the housing inner surface and being maintained within said housing to provide lateral off axis movement away from a central axis of said housing, said adaptive ring including means for supporting a seal within said housing and means for guiding a mating pipe end to enter said seal;

said seal includes an elongated arm "U shape"-cup type seal having a first and second open end with one end larger in diameter than the other, said seal is easily distorted to conform to the surface of said pipe end when said pipe end enters said seal at an angle along an axis other than the central axis of said housing; and means for maintaining the position of the larger open end of said seal.

2. The sealing device as in claim 1 where spring means are included to assist said seal mechanically to maintain a seal on said installed pipe.

3. The sealing device as in claim 1, where said sealing device is used as a union fitting for receiving more than one pipe end.

4. The sealing device as in claim 1 where said sealing device is combined with retaining means which act to keep said pipe end installed in said sealing device.

5. The sealing device as in claim 4 where said retaining means is a portion of a coupling device with more than one port.

6. The sealing device as in claim 4 where said retaining means is a portion of a coupling device that includes at least one pipe end.

7. The sealing device as in claim 4 where said sealing device and said retaining means is a device to be installed in a port.

8. The sealing device as in claim 1 where said sealing device is a device to be installed in a port.

* * * * *

UNITED STATES PATENT AND TRADEMARK OFFICE
CERTIFICATE OF CORRECTION

PATENT NO. : 5,000,491

DATED : Mar. 19, 1991

INVENTOR(S) : Donald D. Bartholomew

It is certified that error appears in the above-identified patent and that said Letters Patent is hereby corrected as shown below:

Col. 1, Line 41, "pierce should be --piece--;

Col. 3, Line 3, "an outward" should be --a pin outward--.

Signed and Sealed this

Twenty-third Day of February, 1993

Attest:

STEPHEN G. KUNIN

*Attesting Officer*   *Acting Commissioner of Patents and Trademarks*